S. J. WOODS & J. POLAR.
RESILIENT TIRE.
APPLICATION FILED NOV. 13, 1916.

1,268,527. Patented June 4, 1918.

Inventor
S. J. Woods,
and J. Polar.

Witness
By
Attorneys.

UNITED STATES PATENT OFFICE.

SAMUEL J. WOODS, OF NEWPORT, RHODE ISLAND, AND JOHAN POLAR, OF CLEVELAND, OHIO.

RESILIENT TIRE.

1,268,527.   Specification of Letters Patent.   Patented June 4, 1918.

Application filed November 13, 1916. Serial No. 131,021.

*To all whom it may concern:*

Be it known that we, SAMUEL J. WOODS and JOHAN POLAR, a citizen of the United States, and a Belgian subject, respectively, residing, respectively, at Newport, in the county of Newport, State of Rhode Island, and at Cleveland, in the county of Cuyahoga and State of Ohio, have invented certain new and useful Improvements in Resilient Tires; and we do hereby declare the following to be a full, clear, and exact description of the invention, such as will enable others skilled in the art to which it appertains to make and use the same.

This invention relates to resilient wheels and has particular reference to resilient wheels which employ pneumatic tubes.

The object of the invention is to construct a pneumatic wheel in which the pneumatic tube is located between a rim and tread element and the wheel structure, so as to be protected by the latter, the wheel thus presenting a comparatively nonyielding and nonresisting tread and an inner air body for absorbing the shocks received by the rim.

With the above object in view and such others relating to the details of construction as will hereinafter appear, our invention will now be fully set forth and described reference being had to the accompanying drawings.

In the drawings:—

Figure 1:
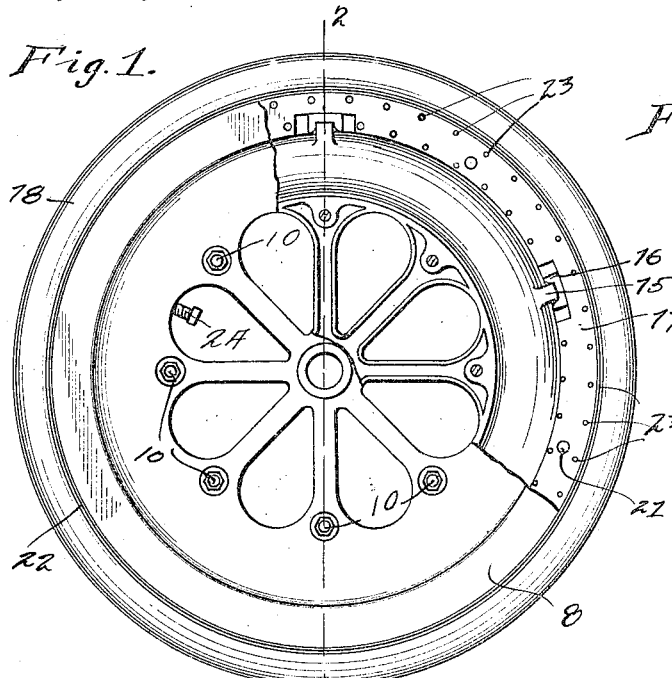
Figure 1 is a side elevation with a portion of the wheel structure broken away.
Figure 2:
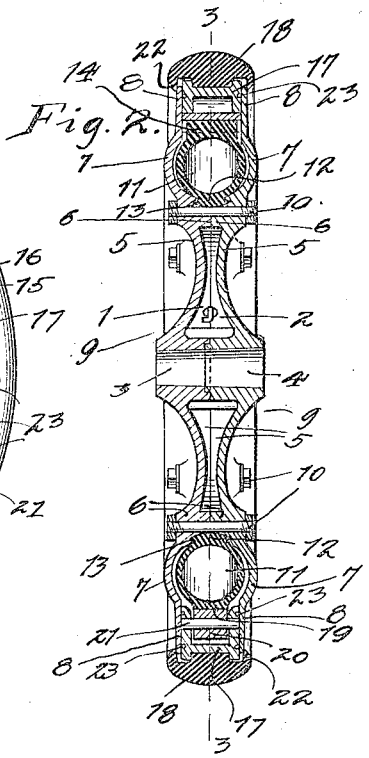
Fig. 2 is a section on line 2—2 of Fig. 1.
Figure 3:
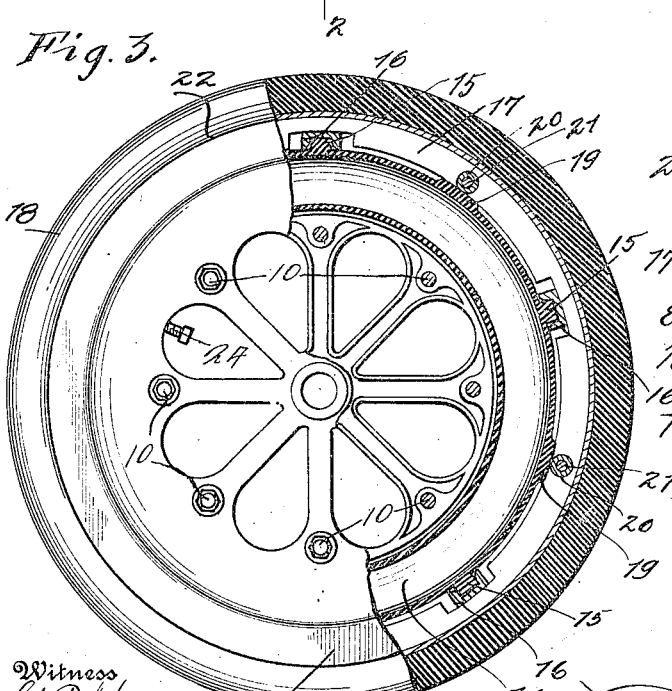
Fig. 3 is a part side elevation and part sectional view.
Figure 4:
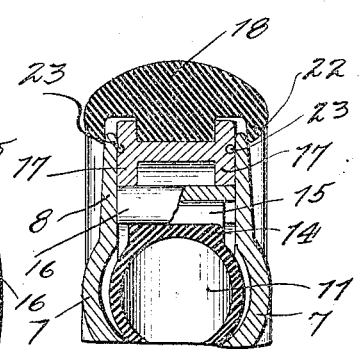
Fig. 4 is a detail sectional view of a portion of the mechanism.

Referring more particularly to the drawings 1 and 2 represent the half sections of a wheel structure which are provided with the hub elements 3 and 4 whose inner ends are interfittingly shouldered in order to preserve a true alinement of their bores. The wheel sections 1 and 2 also have the spoke webs 5 which terminate in the annular abutting ribs 6 and outside of the annular ribs are continued in the outwardly rounded channels 7 and the peripheral guide flanges 8. Obviously, the wheel sections 1 and 2 are identical in construction with the exception of the interfitting shouldered relation of the hub elements 3 and 4, and when opposed and joined by means of the bolts 9 and 10 provide a continuous hub and a circular chamber between the channels 7.

In the chamber formed of the channels 7 is a pneumatic tube 11 whose inner peripheral face is provided with the enlarged bead 12 which is flanged upon opposite sides to form the wedge shaped ribs 13 which fit into correspondingly formed grooves cut into the ribs 6 of the wheel sections. Thus, when the wheel sections are assembled to inclose the pneumatic tube, the latter is securely locked against movement in any direction by its inner peripheral structure. The outer periphery of the tube 11 is provided with a substantially rectangular head 14 which projects freely between the sides of the flanges 8 and is provided at intervals with the knobs 15 upon which are seated the bearing plates 16 whose lower faces are shaped to correspond to the cylindrical surface of the knobs 15 and whose upper faces are curved to seat against the rim 17. The rim 17 consists, generally speaking of an annular I-beam having its web lying horizontally and its flanges projected vertically to provide a seat for a tire 18 upon the outer side and to receive the bearing plates 16 upon its inner flanges. The downwardly projecting flanges of the rim 17 are recessed opposite the knobs 15 to form seats for the plate 16, the recesses being longer than the plate in order to permit a limited play of the latter. The head 14 of the tube 11 is furthermore provided at equally spaced intervals between the knobs 15 with the flat elevations 19 which provide bearing surfaces for rollers 20 which are mounted upon the transverse shaft 21 having bearings in the inner flanges of the rim 17. In some cases the knobs 15 and bearing plate 16 may be dispensed with, and their places occupied by other elevations 19 and rollers 20. Thus, the wheels formed as just stated can advantageously be used for front wheels or other wheels not used as drive wheels.

The tire or tread 18 is formed as a solid element and is expanded in the seat provided by the web of the rim 17, the oppositely projecting flanges thereof firmly holding the tire 18 in position. The sides of the tire 18 are formed in the overhanging flanges 22 which are spaced from the flanges of the rim 17 to permit the guide flanges 18 to ride thereunder, thus providing a dust guard which prevents dust and dirt from finding its way between the flanges 8 and the rim 17 in the tube containing chamber.

The outer faces of the flanges of the rim 17 are provided with spherical recesses in which are seated the balls 23, the marginal edges of the openings being pinched or crimped over the balls to hold them in position. The balls project a comparatively slight distance beyond the faces of the flanges, and provide bearings between said outer faces and the inner faces of the guide flanges 8.

The tube 11 is formed of heavy material, so as to hold the air for a comparatively long period, and since there is no wear thereon, it is practically indestructible. The air is introduced thereto through the air connection 24 which may be projected through the webs 6.

From the foregoing, it is evident that there is provided, according to this invention, a very strong and effective wheel which is well adapted for use upon automobiles and motorcycles. It is impossible to puncture the pneumatic element and the relative movement between the rim 17 and the wheel elements 1 and 2, provide for the absorption of all shocks given to the tread 18. It should be noted that while the relative movement between the rim 17 and the wheel elements is such as to permit the absorption of all shocks, there is a positive driving engagement between the rim and the wheel through the bearing plates 16 and the pneumatic element, so that when the wheel is used as a driving wheel there is no loss of power.

What we claim is:—

1. A resilient wheel, comprising in combination, a pair of interfitting wheel sections including hub, felly, and spoke elements, said felly elements forming an annular chamber therebetween, a pneumatic element seated in said chamber and having ribs locked between the felly elements, bearing flanges formed upon the outer edges of said wheel sections, a rim movable between said flanges and having inwardly extending flanges, bearing blocks seated upon said pneumatic element and carrying said flanges, said blocks also forming locking devices for limiting the relative annular movement of the rim and a tread mounted upon the rim.

2. A resilient wheel, comprising in combination, a pair of interfitting wheel sections including hub, felly, and spoke elements, said felly elements forming an annular chamber therebetween, a pneumatic element seated in said chamber and having ribs locked between the felly elements, bearing flanges formed upon the outer edges of said wheel sections, a rim movable between said flanges and having inwardly extending flanges, bearing blocks seated upon said pneumatic element and carrying said flanges, said blocks also forming locking devices for limiting the relative annular movement of the rim, and a tread mounted upon the rim, said tread having inwardly extending elements overlying the bearing flanges to exclude dirt from the interior of the wheel.

In testimony whereof, we affix our signatures, in the presence of two witnesses.

SAMUEL J. WOODS.
JOHAN POLAR.

Witnesses:
EDWARD WOODS,
CHAS. H. OSTRANDER.